April 8, 1924.  C. G. STRANDLUND  1,489,467
PLOW
Original Filed Dec. 22, 1919

Inventor
Carl G. Strandlund
by W.C. Jirdinston
Attorney

Witness
Erich H. Erickson.

Patented Apr. 8, 1924.

1,489,467

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

PLOW.

Application filed December 22, 1919, Serial No. 346,747. Renewed March 12, 1923.

*To all whom it may concern:*

Be it known that I, CARL G. STRANDLUND, a citizen of the United States, residing at Moline, county of Rock Island, and State of Illinois, have invented certain new and useful Improvements in Plows, of which the following is a specification, reference being had therein to the accompanying drawing.

My invention relates to wheeled plows and more particularly to that class in which power derived from traction of the wheels is utilized to raise the plow from the ground, and the object of my invention is to provide a simple and effective mechanism by the operation of which the rear of the plow is raised.

Referring to the drawings in which similar numerals indicate identical parts—

Figure 1:
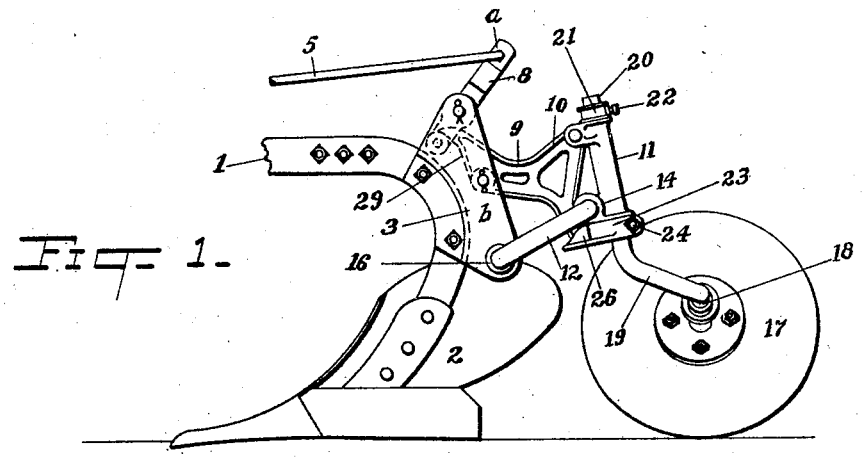
Figure 1 is a side elevation of the rear end of a plow and a rear furrow wheel showing the plow in operative position, and the mechanism connecting the wheel with the plow.
Figures 2, 4:
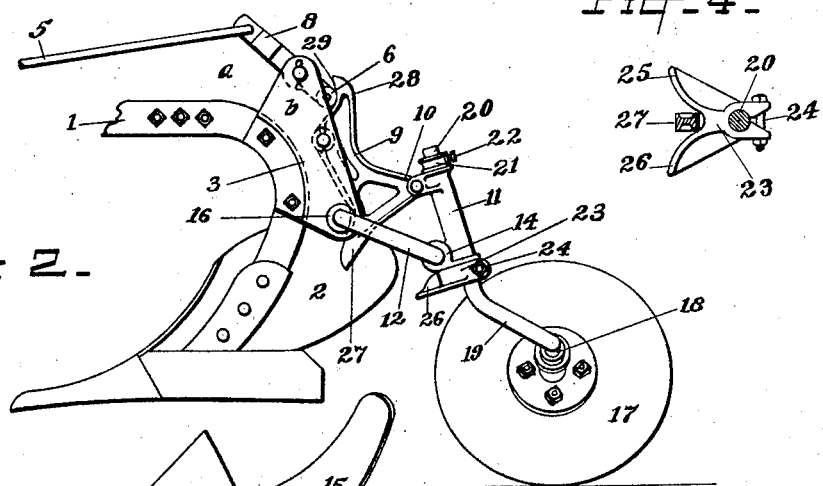
Figure 2 is a similar view to Figure 1, but with the plow raised.
Figure 4 is a detail.
Figure 3:
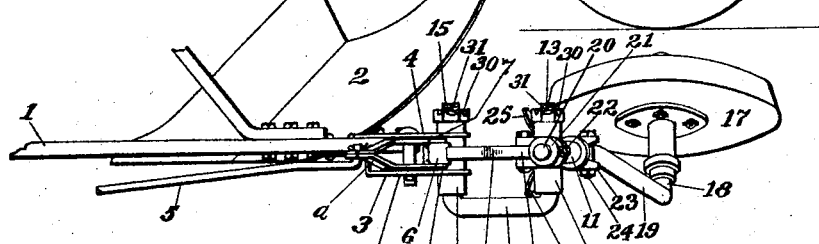
Figure 3 is a plan view of Figure 2.

The plow may include a plurality of plow bodies, but I have shown the rear part of the landward plow body which comprises a beam 1 on which is secured a plow body 2 consisting of the usual type of share, moldboard and landside. In plows of this description the beams are secured together in a suitable manner and are considered as a frame or part of a frame to which various parts of the mechanism are secured or connected. On the rear of the beam 1 are plates or castings 3 and 4 rigidly secured respectively on opposite sides of the beam 1 and forming a bracket *b* on the upper end of which is pivotally mounted, intermediate its ends, a lever *a* having on its lower end a roller 6. The lever *a* is preferably constructed of two bars 7 and 8 between the lower ends of which the roller 6 is mounted; the upper ends of the bars converge to contact and are perforated for the reception of the hooked end of a rod 5 which is secured to the lever by a pin or cotter. The rod 5 extends forwardly to connection with the operating means (not shown) for raising the plow.

Pivotally secured between the plates 3 and 4, and intermediate the upper and lower ends thereof, is a member 9, to a rear projection 10 of which is pivotally connected the upper end of a sleeve 11. The member 9 constitutes one element of a parallel link connection between the sleeve 11 and the plow beam by which rocking of said sleeve when the rear end of the beam is raised or lowered is avoided. The other element of said parallel link connection consists of a U-shaped link 12, having its limbs 13, 15 disposed transversely of the plow, the limb 13 being journaled in a bearing 14 at the lower end of the sleeve 11, and the limb 15 being journaled in a similar bearing 16 at the lower end of the bracket *b*. The limbs 13, 15 are equidistant from the front and rear pivots respectively of the member 9, and, therefore, the link 12 is adapted to swing vertically in parallelism with that portion of member 9 which lies between its front and rear pivots. The arrangement of the link 12 with the laterally projecting limbs as described provides a convenient means for laterally adjusting the lower end of the sleeve 11, as will be hereinafter described. A wheel 17 is mounted on the lower and laterally extending portion 18 of a crank axle 19, the latter extending upwardly as a spindle 20 which is rotatably journaled in the sleeve 11. To prevent other than a rotary movement of the spindle 20 in the sleeve 11, I mount on the spindle 20, above the sleeve 11, a collar 21 and secure it in place by a set screw 22, and below the sleeve 11 I mount on the spindle 20 a casting 23 which is split rearwardly to clasp the spindle 20 and is rigidly clamped thereon by a bolt 24. Forwardly of the sleeve 11 the casting has a notch or recess at the opposite sides of which are flaring arms 25, 26. Said notch is adapted to receive a projection 27 carried by the member 9 and arranged so that when the plow is in operating position said projection extends downward into engagement with said notch and holds the spindle 20 against rotation. The flaring arms 25, 26 serve as guides which automatically co-operate with the projection 27 when the plow is being lowered to restore the furrow wheel 17 to its proper running position, if it should be out of such position, and insure the proper interlocking engagement between the projection 27 and said notch so that the furrow wheel is held against castering when the plow is in its lowered position.

The member 9 is formed with an arm 28 which projects above the pivot point of said member on the bracket *b* and is formed with a forward surface 29 with which the roller 6 is in constant contact; from the point of the arm 28, for a short distance the forward surface 29 thereof is flattened and is at an angle to the remainder which extends toward the pivot of the member 9 on the bracket *b*, so that when the front of the plow is raised, and the lever *a* is rocked through its connection by the rod 5 with the raising mechanism, the rocking of the lever *a* will have no effect upon the member 9 until the flattened portion of the surface 29 has been passed, and in consequence the front of the plow will be rising from the ground before the mechanism for raising the rear of the plow will be operated.

As shown in Figure 1 the plow is down and in operative position and the raising mechanism at the front of the plow has begun to function, rocking the lever *a* as the plow rises; as the operation continues the lever *a* rocks the member 9, which also acts as a lever having its fulcrum on the sleeve 11 and as it is rocked on its pivot on the bracket *b*, the rear of the plow is raised, the limit of its upward movement being fixed by the forward surface of the projection 27 contacting with the bearing 16. It will be noted that, as the member 9 is rocked, the projection 27 is withdrawn from the notch between the arms 25 and 26 of the casting 23, in fact they draw away from each other, resulting in a rapid separation, and leaving the spindle 20 to rotate freely in the sleeve 11 so that the wheel 17 will readily caster to follow a turning movement of the plow. If, when the plow is lowered, the wheel 17 should be at an angle in either direction to the line of draft, it is quickly brought to a position parallel to the line of draft by the arm 27 acting upon either of the flaring arms 25 and 26, depending upon which direction the wheel is angled, and as the casting 23 is rigidly secured on the spindle 20, the arms 25 and 26 being a part of the casting, the wheel 17 is readily swung parallel with the line of draft and secured from departing therefrom by the projection 27 resting between the flaring arms 25 and 26 at the termination of the plow descent. The projection 27 also serves the purpose of limiting the upward movement of the rear portion of the plow beam relatively to the rear furrow wheel, which it accomplishes by reason of the fact that when the beam is raised to a certain point said projection engages a suitable fixed stop on the plow, preferably the limb 15 on the link 12. The advantage of this construction is that it avoids the danger of lifting the rear portion of the plow too high in backing.

A line drawn through the pivots of the member 9 on the sleeve 11 and the bracket *b* will be substantially parallel with the U-shaped link 12 and as the latter is pivotally journaled in a bearing 14 on the sleeve 11, and a similar bearing on the bracket *b*, the upwardly inclined position of the sleeve 11 and spindle 20 is practically constant. As before stated the U-shaped link 12 is supported in bearings 14 and 16. I secure it therein by pins or cotters 30 between which and the bearings is a castellated washer 31, the castellations being spirally arranged and the notches therein being engageable with the cotters 30. By this construction it will be evident that the lower end portion of the sleeve 11 may be adjusted laterally to a limited extent, to adjust the axis of the rear furrow wheel laterally in a transverse vertical plane relatively to the landside of the plow, this being accomplished either by adjusting the limb 13 longitudinally of the bearing 14, or by adjusting the limb 15 longitudinally of the bearing 16. The purpose of this adjustment is to cause the rear furrow wheel to function properly for relieving the pressure of the landside of the plow against the furrow wall. This furrow wheel should be so set that it runs in the angle of the furrow back of the landside and projects far enough beyond the landside toward the wall of the furrow so that it holds the plow in proper running position.

The U-shaped link 12 is the main connecting device between the beam and the rear wheel; that is to say, the part which finally carries the thrusts and stresses. It is made of strong wrought metal. The part 9 is a casting shaped so as to not only serve the purpose, as aforesaid, of a link parallel to that at 12, but so as to also provide a vibrating stop, as at 27, which impinges on the bracket when the beam and body are up, and impinges against a companion stop, as at 26, when they are down; and it also provides a lever arm, as at 28, extending above the forward pivot of said element 9.

What I claim is—

1. In a plow, the combination of a plow carrying beam, a vibratable sleeve bearing, a crank axle having a spindle journaled in the sleeve, a rear furrow wheel mounted on the crank axle, a link pivotally connected to the sleeve and to the beam, a vibratable member having a link-like part approximately parallel to the aforesaid link and also having integral therewith a downwardly projecting stop and an upwardly projecting power receiving arm, and a lever pivotally mounted on the beam and having its short arm arranged to constantly contact with said upwardly projecting power receiving arm.

2. In a plow, the combination of a plow carrying beam, a bracket rigidly secured on the beam, a rockable member pivotally mounted on said bracket, a sleeve bearing pivotally connected at its upper end to said member, a link pivotally connected to the lower end of the sleeve and the bracket, a crank axle having a spindle rotatably journaled in the sleeve, a rear furrow wheel mounted on the crank axle, an upwardly extending arm on said member having a limited flattened surface on its forward side, a lever pivotally mounted intermediate its ends on said bracket and having a roller on its lower end in a constant contact with said flattened surface, said lever operable to rock said member to raise the plow.

3. In a plow, the combination of a plow carrying beam, a bracket rigidly secured on the beam, a rockable member pivotally mounted on said bracket and having an arm extending upwardly above its pivot, a limited flattened surface on the forward side of said arm, a sleeve bearing pivotally connected to a rearwardly extending arm on said member, a link pivotally connected to the lower end of said sleeve and to the bracket below the pivot of said member, a lever pivotally mounted intermediate its ends on said bracket and having a roller on its lower end in constant contact with said flattened surface, said lever operable to rock said member to raise the plow, a casting rigidly secured on said spindle and having forwardly diverging arms, and a downwardly extending arm on the rockable member adapted to be embraced in the narrow space between said arms to hold the spindle against rotation.

4. In a plow, the combination of a plow carrying beam, a sleeve disposed back of said beam and having parallel link connections therewith, a crank axle journaled in said sleeve, a furrow wheel mounted on said crank axle, a lever for swinging said parallel connections vertically to raise or lower the plow, and means carried by one of said connections and adapted to co-operate with said crank axle when the plow is lowered to lock said wheel against castering, and when the plow is raised to release said wheel to permit castering thereof.

5. In a plow, the combination of a plow carrying beam, a sleeve disposed back of said beam and having parallel link connections therewith, a crank axle journaled in said sleeve, a furrow wheel mounted on said crank axle, and a lever carried by said beam for swinging said parallel connections to raise or lower the plow, said lever having a limited range of movement independently of said connections when the plow is in its lowered position.

6. In a plow, the combination of a plow carrying beam, a vertically swinging member pivotally connected with said beam, a sleeve pivotally connected with said member, a link pivotally connected with the beam and sleeve in substantial parallelism with the pivots of said member, a crank axle journaled in said sleeve, a furrow wheel mounted on said crank axle, an arm carried by said vertically swinging member, and a lever carried by the beam and adapted to engage and actuate said arm to swing said member vertically to raise or lower the plow, said lever being movable, to a limited extent, independently of said arm when the plow is in its lowered position.

7. In a plow, the combination of a plow carrying beam, a sleeve bearing, a crank axle having a spindle journaled in said sleeve, a rear furrow wheel mounted on the crank axle, a link pivotally connected with the sleeve and with the beam, a member pivotally connected with the sleeve and with the beam in substantial parallelism with said link, and having a downwardly projecting arm adapted to engage and lock said crank axle against turning when the plow is in its lowered position and to release the same when the plow is lifted out of plowing position, and a lever adapted to be actuated to lift the plow relatively to said rear furrow wheel, and to move said arm out of operative relation to said crank axle.

8. In a plow, the combination of a plow carrying beam, a sleeve bearing, a crank axle having a spindle journaled in said sleeve, a rear furrow wheel mounted on the crank axle, a link pivotally connected with the sleeve and with the beam, a member pivotally connected with the sleeve and with the beam in substantial parallelism with said link and having a downwardly projecting arm adapted to engage and lock said crank axle against turning when the plow is in its lowered position and to release the same when the plow is lifted out of plowing position, said arm being also adapted to engage a suitable stop when the plow is lifted out of operative position, to limit the extent to which the plow may rise relatively to the furrow wheel, and a lever adapted to be actuated to lift the plow relatively to said rear furrow wheel.

9. In a plow, the combination of a plow carrying beam, a sleeve pivotally connected with said beam, a crank axle journaled in said sleeve, a rear furrow wheel mounted on said crank axle, means for adjusting the axis of the furrow wheel laterally in a transverse vertical plane relatively to the landside of the plow, and means for lifting the plow relatively to the furrow wheel.

10. In a plow, the combination of a plow carrying beam, a vertically swinging member pivotally connected with said beam, a sleeve pivotally connected with said member, a link pivotally connected with the beam and sleeve in substantial parallelism with the pivots of said member, a crank axle journaled in said sleeve, a rear furrow wheel mounted on said crank axle, means for adjusting the axis of the furrow wheel laterally in a transverse vertical plane relatively to the landside of the plow, and means for lifting the plow relatively to the furrow wheel.

11. In a plow, the combination of a plow carrying beam, a vertically swinging member pivotally connected with said beam, a sleeve pivotally connected with said member, a crank axle journaled in said sleeve, a rear furrow wheel mounted on said crank axle, a U-shaped link, one of the limbs of said link being pivotally connected with the beam and the other limb thereof being pivotally connected with said sleeve, means whereby one of the pivotal connections of said link may be adjusted to move the furrow wheel laterally relatively to the landside of the plow, and means for lifting the plow relatively to the furrow wheel.

CARL G. STRANDLUND.